(No Model.)
E. H. B. TAYLOR & J. D. WIMER.
SAW TOOTH AND MEANS FOR SECURING SAME.
No. 509,407. Patented Nov. 28, 1893.
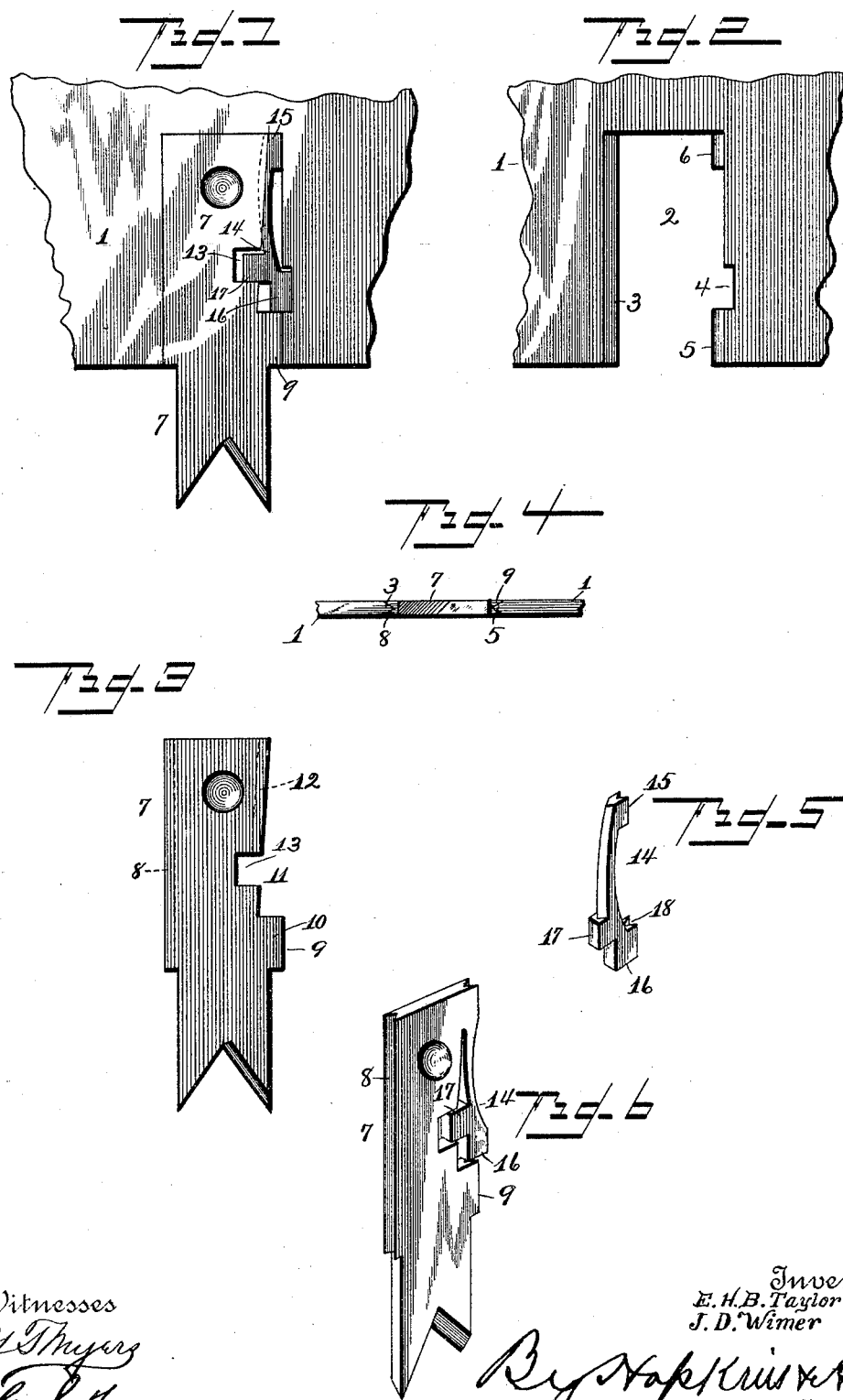
Witnesses
Inventors
E. H. B. Taylor and
J. D. Wimer
Attorneys

UNITED STATES PATENT OFFICE.

EBEN H. B. TAYLOR AND JEFFERSON D. WIMER, OF WOODVILLE, OREGON.

SAW-TOOTH AND MEANS FOR SECURING SAME.

SPECIFICATION forming part of Letters Patent No. 509,407, dated November 28, 1893.

Application filed January 19, 1893. Serial No. 459,031. (No model.)

*To all whom it may concern:*

Be it known that we, EBEN H. B. TAYLOR and JEFFERSON D. WIMER, both of Woodville, county of Jackson, and State of Oregon, have invented certain new and useful Improvements in Saw-Teeth and Means for Securing the Same in Saws, of which the following is a specification, reference being had to the accompanying drawings.

The object of our invention is to produce an improved saw tooth, and means for securing it in a saw, whereby it may be readily set in place and removed with facility, but which is secured against accidental displacement.

In the accompanying drawings, Figure 1 is a side elevation of a section of saw containing one of our teeth. Fig. 2, is an elevation of a section of the saw showing the tooth recess. Fig. 3, is an elevation of the tooth with the key removed. Fig. 4, is a detail perspective of the key. Fig. 5, is an end view of the tooth in place; and Fig. 6, is a perspective view of a tooth provided with an integral spring key.

Referring to the figures on the drawings, 1 indicates a section of saw blade having a recess 2, provided with a V-shaped edge 3 on one side and upon the other side with a longitudinal recess 4, and V-shaped projections 5 and 6 at its opposite ends.

7 indicates the tooth, which is made with a V-shaped groove 8 on one side to slide upon the edge 3 of the saw blade. It is provided with a projection 9 having a V-shaped groove 10, with which the V-shaped edge of the projection 5 engages.

11 indicates a tapered edge having a longitudinal V-shaped groove 12 a portion of its length, and a notch 13 near the projection 9.

14 indicates a spring key having an angular face on one side adapted to fit the groove 12, and upon one end a curved shoe 15 adapted to fit over the edge 6 and secure the end of the tooth in place. 16 indicates its head, and 17 a projection adapted to fit in the notch 13. The head is provided with a longitudinal groove 18 on its inner side. The tendency of the spring key is to press the groove against the recess of the saw blade, and in this position the tooth is securely fixed into the blade. If however the spring be pressed back so that the head of the key lies flat against the tooth, its groove 18 will coincide with the V-shaped edge 5, and will allow the removal of the tooth. In putting the tooth in position the grooved face of the head follows the same edge until the head enters the recess 4 so that the key springs into place and secures the key as before.

Instead of making the key removable we prefer to make it a part of the tooth, as shown in Fig. 6 of the drawings. In this connection the office of the key is the same, its only difference being that the groove 12 in the tooth and the angular face 14 of the key are omitted. They are designed to hold a separable key to the tooth, and when the key is made a part of the tooth their necessity is obviated.

What we claim is—

1. The combination with a transversely recessed saw blade having a longitudinal recess in one side thereof, of a tooth provided with a transverse notch and having a spring key provided with projections on opposite sides thereof adapted to engage, respectively, with the longitudinal recess and transverse notch, substantially as and for the purpose specified.

2. The combination with a saw blade provided with a transverse recess having a longitudinal V shaped edge upon one side and V shaped projections at opposite ends of the other side, and a longitudinal recess between said projections, of a tooth provided with a V shaped longitudinal groove on one side, and a spring key secured at one end to the tooth and having upon its ends, respectively, a shoe and head having V shaped grooves, the grooves upon the tooth and spring key being adapted to receive the V shaped projections in the transverse recess and the spring key head being adapted to spring into the longitudinal recess to hold the tooth in place, substantially as specified.

In testimony of all which we have hereunto subscribed our names.

EBEN H. B. TAYLOR.
JEFFERSON D. WIMER.

Witnesses:
D. L. WILSON,
J. W. ROBINSON.